US006970908B1

(12) United States Patent
Larky et al.

(10) Patent No.: US 6,970,908 B1
(45) Date of Patent: Nov. 29, 2005

(54) METHOD OF EMAIL ATTACHMENT CONFIRMATION

(75) Inventors: Steven Larky, Del Mar, CA (US); Ronald H. Sartore, Poway, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 689 days.

(21) Appl. No.: 09/819,592

(22) Filed: Mar. 27, 2001

(51) Int. Cl.[7] ............................................. G06F 15/16
(52) U.S. Cl. ...................... 709/206; 709/201; 709/203; 707/6
(58) Field of Search ............................... 709/200, 203, 709/206, 201; 715/500, 526, 533; 707/10, 707/200, 500, 6

(56) References Cited

U.S. PATENT DOCUMENTS

| | | | |
|---|---|---|---|
| 5,765,180 A * | 6/1998 | Travis ........................ | 715/533 |
| 6,073,133 A * | 6/2000 | Chrabaszcz ................. | 709/200 |
| 6,405,225 B1 * | 6/2002 | Apfel et al. ................. | 709/206 |
| 6,434,601 B1 * | 8/2002 | Rollins ........................ | 709/206 |
| 6,453,338 B1 * | 9/2002 | Shiono ........................ | 709/206 |
| 6,460,074 B1 * | 10/2002 | Fishkin ........................ | 709/206 |
| 6,671,718 B1 * | 12/2003 | Meister et al. .............. | 709/206 |
| 6,898,622 B1 * | 5/2005 | Malik ........................ | 709/206 |

* cited by examiner

Primary Examiner—Ario Etienne
Assistant Examiner—Ramy Osman
(74) Attorney, Agent, or Firm—Wagner, Murabito & Hao LLP (57) ABSTRACT

The present invention provides a method for automatically determining, and accordingly prompting an email user as to whether an attachment is to accompany an email message prior to transmission of the message. In one embodiment, the present invention provides a method, which can prompt an email user as to whether an attachment is to accompany an email addressed to certain individuals, groups, or organizations, prior to transmission of the message. In one embodiment, a database of certain addressees to whom attachments are frequently transmitted is consulted. In one embodiment, the present invention provides a method, which automatically prompts users based on the content of an email message as to whether an attachment is desired prior to transmission. In one embodiment, a database of certain keywords appearing in message text frequently correlated with attachment inclusion is consulted. In one embodiment, the databases are automatically updated by a self-learning modality.

24 Claims, 10 Drawing Sheets

401 E-MAIL DATABASE

402 ADDRESSEES DATABASE

402A GROUPS DATABASE a_able, b_best, c_casey, d_dennis, e_easy, f_foont a_able, e_easy c_casey, m_micelson, p_oneil

402B INDIVIDUALS DATABASE a_able b_boss t_riffic

403 KEY WORDS DATABASE is attached attachment here is the spreadsheet included in this email spreadsheet (figure)(picture)(report)(etc.)

here are the figures here is the picture here is the report

METHOD OF EMAIL ATTACHMENT CONFIRMATION

BACKGROUND OF THE INVENTION

1. Field of the Invention

The present invention relates to the field of computer programs for communications. Specifically, the invention is designed to provide a method and system thereof for confirming that attachments are made to relevant email messages prior to their transmission.

2. Related Art

Electronic mail (email) has become a common mode of communication.

It is fast, inexpensive, simple, and accessible. As such, communication between individuals, between individuals and groups, between groups, and organizations of all sizes, ubiquitously and increasingly, flows by this mode.

Messages transmitted by email may vary in size and scope, from the simplest one-line queries, notes, acknowledgments, and greetings, etc., to elaborate communiqués. Often, information is transmitted by email outside the message itself, as an attachment to the message, in other than an email message format. Attachments may include documents, pictures, spreadsheets, sound and/or video, and a virtually unlimited host of other electronic information formats.

To transmit information by an email attachment, most commonly an email sender addresses a message to the intended recipient, e.g., an addressee. They usually, though not always, prepare an email message in email format, attach a file to be transmitted with the note as an email attachment, and send the email to the addressee.

To transmit an email message with accompanying attachments successfully, an email sender must remember that the message being prepared requires the attachment of a message. To transmit information via email attachments to certain individuals requiring the information, an email user must remember the addressees who require such attachments.

Quite often, the email sender may forget to attach the information intended for transmission to the message prior to sending the message. Thus, addressees, e.g., the intended recipient of the information, receives an email message, perhaps referring to attached information, but without the information attached. Furthermore, the sender will not get an error message because the email software did not know that an attachment was required.

This is an annoyingly common mistake. In one survey, estimates from individuals queried ranged from 10% to 50% of the incidence of times wherein he/she sends an email message with an attachment, a first transmission of the email message was sent prior to affixing the attachment. This has discernible deleterious results including excessive email transmission, lost time, lost productivity, embarrassment, confusion, and the possibility of delay in transmitting important, time-sensitive information.

An email user sending a message to which an attachment is desired must remember to attach the information intended for transmission. Conventionally, a user may rely on memory and concentration to realize that affixing an attachment is required before sending an email message. However, forgetfulness and preoccupation render this a problematic and ineffective solution.

Another conventional approach an email-user may take is to make manual lists of certain individuals or groups to whom his messages normally require attachments, or use other pneumonic aids, such as post-it notes to remind him or herself to affix attachments prior to sending email. However, the user must then remember, or take the time, to consult the lists. Further, pneumonic aids may be inconvenient, cluttersome, easily lost or covered, incompatible with locale and/or schedule, and inaccurate.

A further conventional approach may be to prompt a user each and every time an email message is to be transmitted as to whether or not an attachment is desired. However, this may become annoying, distracting, and confusing for some users, and require extra effort and time to respond in the negative, e.g., that no attachment is desired, to enable a send function. This may result in disabling, e.g., turning off, the prompting feature by many users, effectively negating whatever benefit it could provide. Thus, conventional approaches to solving this problem are ineffective.

DISCLOSURE OF THE INVENTION

Accordingly, a need exists for a method and/or system, which can automatically determine if an attachment is needed on an email message and then prompt an email user as to whether an attachment is to accompany an email message prior to transmission of the message. A need also exists for a method and/or system, which can prompt an email user as to whether an attachment is to accompany an email addressed to certain individuals, groups, or organizations, prior to transmission of the message. Further, a need exists for a method and/or system, which can automatically prompt a user based on the content of an email message as to whether an attachment is desired prior to transmission. Further still, a need exists for a method and/or system, which can achieve the foregoing while being easily and inexpensively implemented, without annoying a user, and which is simple and transparent to use. These and other objects and advantages of the present invention will become obvious to those of ordinary skill in the art after reading the following detailed description of the preferred embodiments, which are illustrated in the various drawing figures.

The present invention provides a method and a system thereof, which automatically determines if an attachment may be needed on an email message and which then prompts an email user as to whether an attachment is to accompany an email message prior to transmission of the message. In one embodiment, the present invention provides a method, which can prompt an email user as to whether an attachment is to accompany an email addressed to certain individuals, groups, or organizations, prior to transmission of the message. In one embodiment, a database of certain addressees to whom attachments are frequently transmitted is consulted. In one embodiment, the present invention provides a method, which automatically prompts users based on the content of an email message as to whether an attachment is desired prior to transmission. In one embodiment, a database of certain keywords appearing in message text frequently correlated with attachment inclusion is consulted. In one embodiment, the databases are automatically updated by a self-learning modality. In one embodiment, the method is implemented on a computer system. In one embodiment, the computer system implements the method under control of a computer readable medium implanted thereon.

In one embodiment, the present invention provides a method and a system thereof, which prompts an email user as to whether an attachment is to accompany an email message, prior to transmission of the message. When the present embodiment determines that it is likely that an email message attachment may be desirable, it prompts the user. Prompting, in one embodiment, may be by triggering a query box or other pop-up or drop-down screen feature, such as windows™. In another embodiment, prompting mechanisms may be applied including, but not limited to, other visual cues (e.g., 'toolbar' flashing buttons), audible cues (e.g., tones or synthesized speech), and combinations of prompting cue mechanisms. In one embodiment, triggering may be at the time a process detects the intention of attachment. In another embodiment, triggering may occur upon selection of the 'send' operation.

In one embodiment, the present invention provides a method, which prompts an email user as to whether an attachment is to accompany an email addressed to certain individuals, groups, or organizations, prior to transmission of the message. Often, emails addressed to certain addressees are transmitted with attachments desired to a greater frequency than other or most other addressees. In one embodiment, a heuristic causes a database of certain addressees to whom attachments are frequently transmitted to be consulted. In the present embodiment, where an email message is addressed to an addressee recognized as listed in the high frequency of attachment addressee database, and no attachment is affixed to the message, the user will be prompted upon attempting to send the message, as to whether or not an attachment is desired. In one embodiment, users may specify certain recipients, aliases, or groups of addressees that typically get emails with attachments, effectively building, or adding to a addressee/attachment database. In another embodiment, the database is updated automatically.

In one embodiment, the present invention provides a method, which automatically prompts users based on the content of an email message as to whether an attachment is desired prior to transmission. In one embodiment, a process is added to an email software program to detect, from the content of the email message, whether or not the sender of the message is intending to add an attachment to the message. If the process determines that an attachment is desired, it will trigger a query box to pop-up to remind the sender that an attachment is probably desired and the email currently has no attachment included. Often, email message text may contain certain keywords or key phrases correlated to a high degree with frequent inclusion attachments. For example, certain words or phrases refer to attachments directly; e.g., "attachment," "attached," "here is the attachment," etc. Other keywords may refer to certain types of information frequently transmitted as attachments; e.g., "spreadsheet," "report," "picture," etc. In one embodiment, a database of certain keywords appearing in message text frequently correlated with attachment inclusion is consulted. In the present embodiment, where the text of an email message contains keywords recognized as listed in the high frequency of attachment correlated keyword/phrase database, and no attachment is affixed to the message, the user will be prompted upon attempting to send the message, as to whether or not an attachment is desired.

In one embodiment, the process to detect the intent of attachment consists of a series of standard phrases, which may be preprogrammed into a database. In one embodiment, users may add keywords/phrases of their own choosing. In one embodiment, users may select keywords/phrases from a menu of pre-programmed selection. In one embodiment, a user may improve and individualize the process by highlighting phrases or terms that may indicate, in future emails, when an attachment is intended, effectively adding them to the keywords/phrases database. Such improvement may be done for example, upon sending an email erroneously without an attachment; a user may highlight text that may subsequently prompt attachment, preventing the erroneous attachment transmission in future emails.

In one embodiment, the process databases are preset. In one embodiment, users may add to the process databases. In one embodiment, the databases are automatically updated by a self-learning modality. In one embodiment, the self-learning may be enabled by determining the frequency with which emails are transmitted with attachments to certain addressees and, where transmissions accompanied by attachments are made with high or increasing frequency, adding those addressees to the addressee/attachment database accordingly. Conversely, as the frequency of transmission with attachments to certain addressees decreases, and/or the frequency of intentional transmission without attachments to those addressees rises, those addressees may be removed from the addressee/attachment database. Advantageously, this prevents unnecessary further attachment prompts for addressees who no longer require such prompting, thus reducing user inconvenience and annoyance.

In one embodiment, the self-learning may be enabled by correlating words, phrases, and other terms in email message text to a determined frequency of email transmission accompanied by attachments. In one embodiment, this correlation is performed by parsing of message texts. Where a strong correlation between certain words, phrases and other terms and frequency of attachments transmitted with email messages is found, the words, phrases and other terms may be identified as keywords and 'key phrases,' and added to a keywords/phrases database accordingly. Conversely, as the frequency of intentional transmission without attachments to messages containing those keywords/phrases increases, those keywords/phrases may be removed from the keywords/phrases database. Advantageously, this prevents unnecessary further attachment prompts for messages that no longer require such prompting, thus reducing user inconvenience and annoyance.

In one embodiment, the present invention may be deployed on a host computer system serving as a platform for email communication. In one embodiment, the present invention may be deployed in a computer usable medium for deployment on a computer system.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions, which follow, are presented in terms of procedures, steps, logic blocks, processing, and other symbolic representations of operations oh data bits that can be performed by computer systems. These descriptions and representations are used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "adjusting," "affixing," "alerting," "attaching," "comparing," "confirming," "considering," "detecting," "determining," "displaying," "generating," "identifying," "parsing," "performing," "prompting," "reading," "recognizing," "sending," "transmitting," "triggering,", updating," or the like, refer to the action and processes of a computer system, or similar electronic computing device, that manipulates and transforms data represented as physical, e.g., electronic quantities within the communications and computer systems' registers and memories into other data similarly represented as physical quantities within the computer system memories or registers or other such information storage, transmission, or display devices.

The present invention is discussed primarily in the context of electronic mail (email) programs, such as Microsoft Outlook™, Netscape Messenger™, and Qualcomm Eudora™ deployed on an exemplary computer system, e.g., a personal computer (PC) system. However, it is appreciated that the present invention is not limited to these particular email programs or to other related or similar email programs, nor to deployment on PCs. On the contrary, the present invention may be used with other types of email programs, other programs adapted to facilitate email, and deployed on other computer systems, and on computers engaged in other applications, including but not limited to UNIX systems, Macintosh™, portable digital assistants (PDAs), laptop and palmtop computers, portable web browsers, cellular telephones, two-way pagers, other pagers, other data and communication systems, and a plethora of other functionalities with email capabilities.

Exemplary Computer System

Figure 1:
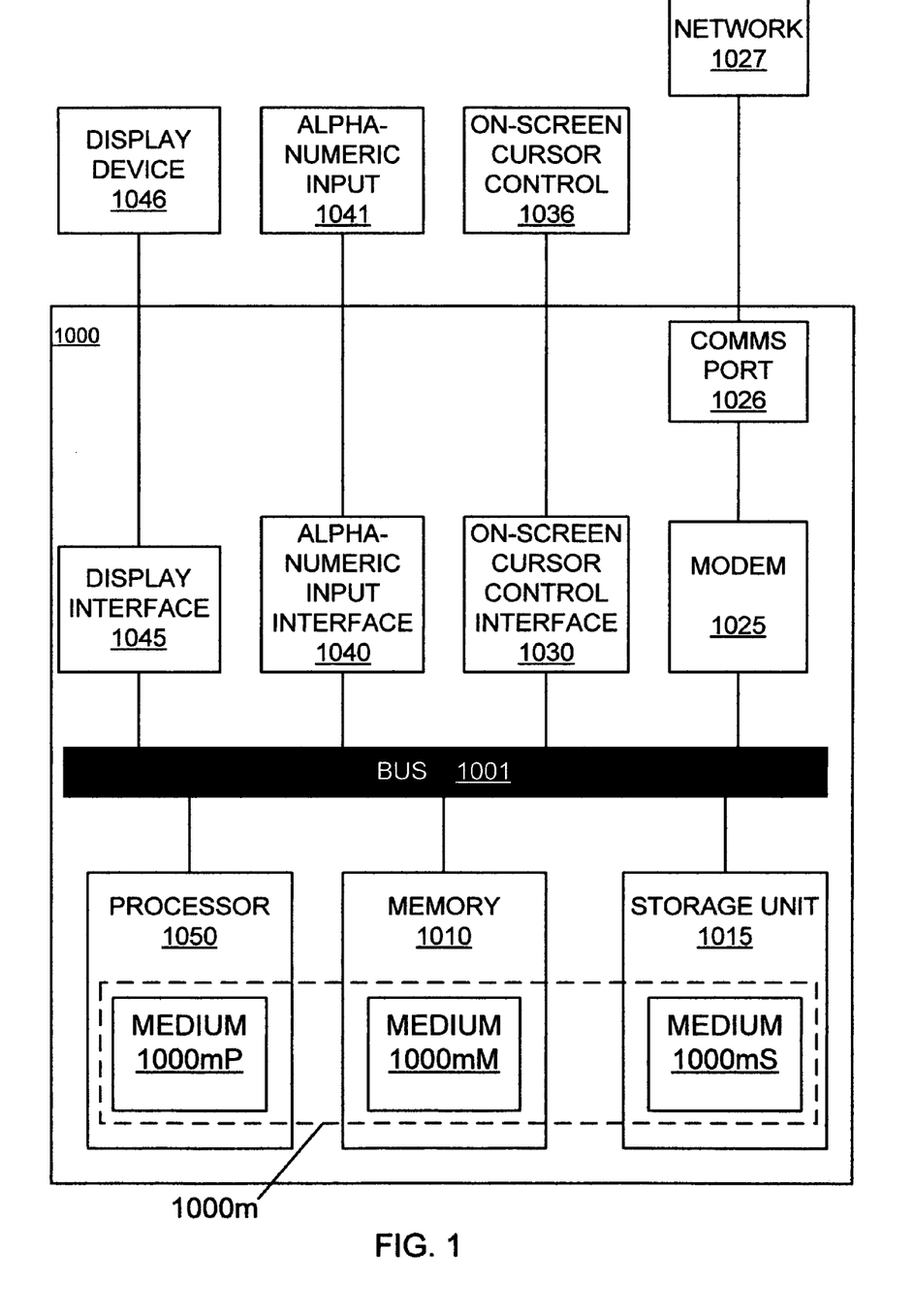
FIG. 1 is a block diagram depicting a computer system for reading computer readable code for implementing a process of confirming that appropriate email messages bear attachments, in accordance with one embodiment of the present invention.

In accordance with one embodiment of the present invention, a computer system 1000 and computer usable medium 1000m enables the prompting of an email user as to whether an attachment is to accompany an email message prior to transmission of the message. With reference to FIG. 1, computer system 1000 includes a bus 1001 for communicating information, a central processor 1050 coupled with the bus 1001 for processing information and instructions, and a memory unit 1010 (e.g., random access memory and/or read only memory) and a data storage system 1015 coupled with the bus 1001 for storing information and instructions. Data storage system 1015 may be any magnetic and/or optical disc and drive/reader, or any other data storage device.

In one embodiment of the present invention, the processes described, including but not limited to prompting an email user as to whether an attachment is to accompany an email message prior to transmission of the message and updating of related databases. (e.g., Process 500, FIG. 5), may be executed by processor 1050, which may an application specific integrated circuit (ASIC). Alternatively, these methods may be implemented by processor 1050 executing a program stored in memory 1010 and/or data storage system 1015. It is appreciated that computer system 1000 may implement the invention by combinations of these schemes, or by alternatives other than those pictured. It is also appreciated that computer system 1000 can include other elements not shown. It is further appreciated that computer system 1000 may be constituted by any functional equivalent, or by any viable alternative architecture.

In the present embodiment, computer system 1000 includes a communications device 1025. Communications device 1025 may be a modulator/demodulator (MODEM). Communications device 1025 enables communication via a communications port 1026.

In the present embodiment, computer system 1000 may be communicatively coupled with an external network 1027, via communications port 1026. External network 1027 may be a local area network (LAN), or any other feasible network configuration, and may include other networks including wide area networks (WAN) and the Internet.

Computer system 1000 executes, in one implementation, a program embodied in a computer readable medium 1000m which may be deployed in and/or to various degrees between processor 1050 (e.g., as 1000 mP), memory 1010 (e.g., as 1000 mM), and storage unit 1015 (e.g., as 1000 mS). In the present implementation, execution of this program by computer system 1000 enables the prompting of an email user as to whether an attachment is to accompany an email message prior to transmission of the message.

In the present embodiment, system 1000 also optionally contains a display interface 1045 coupled to the bus 1001 for enabling incorporation of a display device 1046. Display device 1046 enables displaying information to users.

System 1000 may include an alphanumeric input interface 1040 coupled to the bus 1001 for enabling incorporation of an alphanumeric input device 1041. Alphanumeric input device 1041 can communicate information and command selections to processor 1050 via alphanumeric input interface 1040 and bus 1001.

System 1000 also includes an optional cursor control or directing device (on-screen cursor control 1036) coupled to bus 1001 via on-screen cursor control interface 1030, for communicating user input information and command selections to processor 1050. In one implementation, on-screen cursor control 1036 is a mouse, trackball, joystick or special keys on alphanumeric input device 1041 capable of signaling movement of a given direction or manner of displacement.

In one embodiment, computer system 1000 may be a PC, either a desktop, a laptop, or another implementation. In another embodiment, computer system 1000 may be another computer platform, including, but not limited to PC type platforms, e.g., Macintosh, UNIX, workstations of various types. In yet another embodiment, computer system 1000 may be a portable computer platform, such as a PDA, palmtop computer, portable web browser, or the like. In another embodiment, system 1000 may be any other intelligent electronic system capable of implementing computer functions, such as cellular telephones, two-way pagers, other pagers, other data and communication systems, and other information processing platforms with email capabilities.

Exemplary E-Mail Structures

Basic E-Mail Format

Figure 2A:
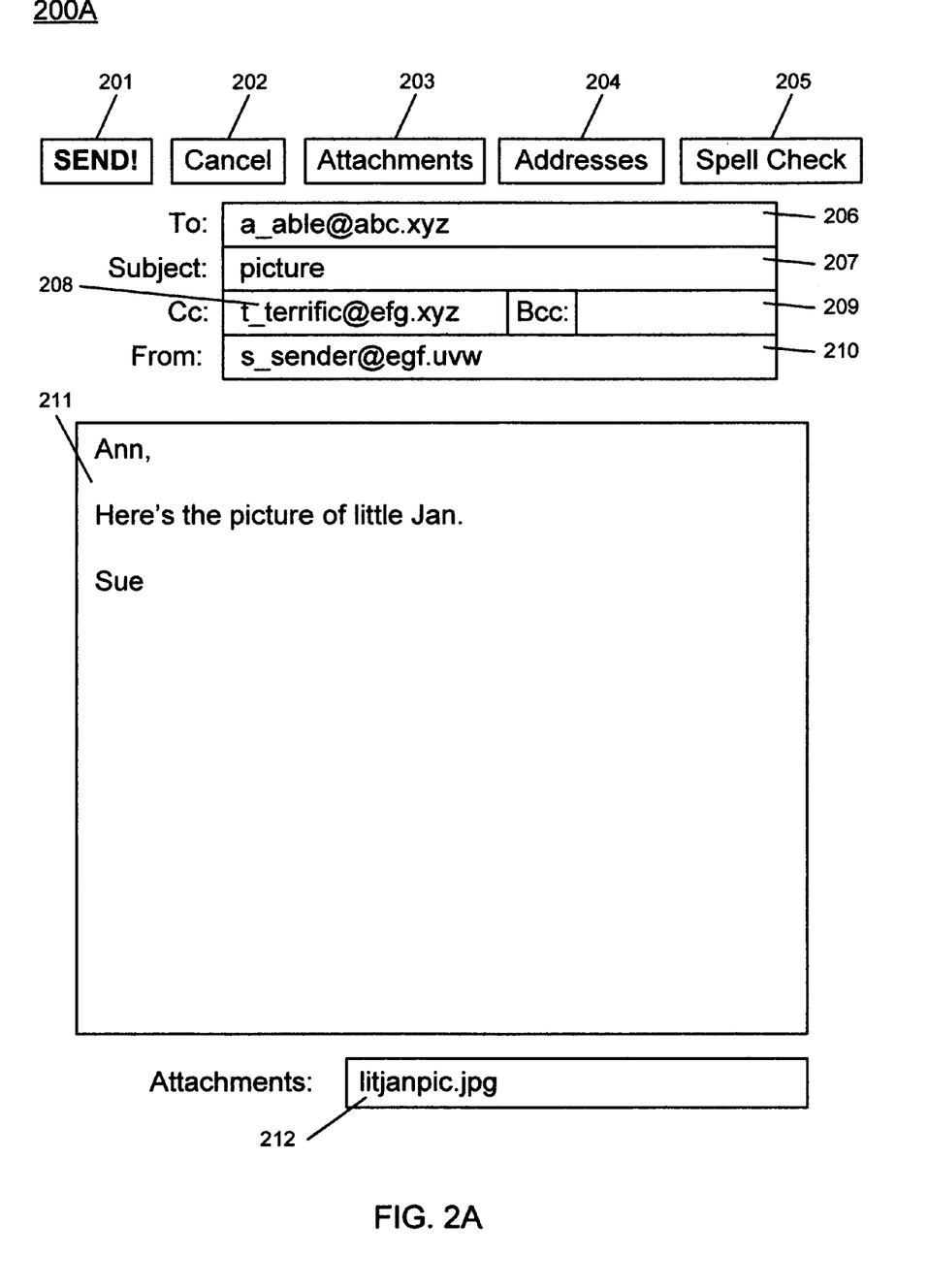
FIG. 2A is a screen shot from a computer display screen depicting a simple sample email message, bearing an attachment, with single 'To' and 'Cc' addressees, in accordance with one embodiment of the present invention.

Referring now to FIG. 2A, a simulated screen shot from a computer display screen (e.g., display 1046, FIG. 1) depicts a simple sample email message 200A to be sent by a user. Message 200A bears an attachment, and has single 'To' and 'Cc' addressees, in accordance with one embodiment of the present invention.

'Send' screen button 201 may be activated by the action of a user applying a cursor control movement, position, and control device (e.g., cursor control 1035, FIG. 1). The on-screen cursor may be manipulated by a user to place it on 'send' screen button 201 (and/or any of the subsequent screen buttons discussed below). The action of the 'send' screen button (and/or any of the subsequent screen buttons discussed below) is triggered, in one implementation, by a click action triggering feature, e.g., as on a "mouse." Activation of 'send' screen button 201 in the present implementation results in an associated email system (e.g., computer system 1000, FIG. 1) transmitting, e.g., sending email message 200A.

Email message 200A may be removed from the screen without sending by the action of a 'cancel' screen button 202. In one embodiment, activation of 'cancel' screen button 202 deletes the entire content, including text, addressing, and attachments, of email message 200A. In one embodiment, activation of 'cancel' screen button 202 may prompt a cue regarding the impending deletion and accord a user the option of saving, caching, or moving the message 200A prior to total deletion.

'Attachment' screen key 203 enables the attachment of data extraneous to the body of message 200A, to the message, prior to sending, for transmission with message 200A as an attachment. Information may be attached as data files. Such files include, but are not limited to, additional text, reports, forms, spreadsheets, pictures, audiovisual data files, database contents, etc. In one embodiment, activation of 'attachment' screen button 203 provides on-screen accessibility to files to be attached, allowing selectivity, browsing for files, and encryption of the information by a user via other on-screen features.

Upon attaching an attachment by the action of 'attachment' screen button 203, the attachment is automatically listed in an identifiable form in 'attachment' field 212. More than one attachment may be attached by the action of 'attachment' screen button 203. In the present embodiment, when more than one attachment is attached to message 200A, each attachment will be listed in 'attachment' field 212.

In one embodiment, an 'addresses' screen button 204 provides on-screen access to the sending user of an 'address' database, containing the email addresses and other information about potential and/or desired addressees. In one embodiment, the 'address' database may be modified and/or supplemented by the user.

Activation of a 'spell check' screen button 205 in one embodiment provides a sending user access to an on-screen available spelling checking feature. This feature allows the user to insure that his or her message contains no spelling errors of words in the database. In one embodiment, related features may be accessed through 'spell check' screen button 205, or via similar screen buttons which may be added. Such features include, but are not limited to 'thesaurus' and 'grammar' checking functions.

In the present embodiment, 'To' field 206 contains the email address of the addressee. The addressee may be addressed by a name, formal email address, alias, URL, or any other electronically codable moniker. 'To' field 206, like the subsequent fields to be discussed, may be accessed by a user moving a cursor to the field, activating the field by a clicking, or other activation feature, and typing the addressee's email address, as above, using an alphanumeric input device, such as a keyboard (e.g., alphanumeric input device 1036, FIG. 1). In one embodiment, an addressee's address may be emplaced in address field 206 directly from an address database accessed via addresses screen button 204. In another embodiment, the address, like further alphanumeric information to be added in fields and/or text fields to be discussed subsequently, to the message 200A, may be made via icons, voice-to-text implementations, digitizer input, or by other means. If message 200A is to be sent to more than one addressee simultaneously, in the present embodiment each addressee's email address is added within 'to' field 206.

'Subject' field 207 contains an optional summary, title, or description of massage 207.

'Cc' field 208 contains the email addresses of indirect addressees, to whom a duplicate, e.g., "carbon copy" of message 200A may be transmitted by inclusion in this field 208. 'Bcc' field 209, similarly, contains the email addresses of indirect addressees, to whom a duplicate, e.g., "blind carbon copy" of message 200A may be transmitted by inclusion in this field 209, but without listing the Bcc addresses to the direct 'To' or indirect 'Cc' addressees.

'From' field 210 contains the email address of the sending user.

Text field 211 contains the textual message, if any, of an email message. Message text may be arranged much like a traditional letter, with a header or salutation, content, and a sign-off clause. Texts may be written to any desired degree of formality or informality. Often, but by no means always, email messages are considerably less formal than traditional letters; more on the lines of a short note. Frequently, in the present embodiment, semantic content of the text, particularly certain nouns and verbs, indicate, directly or by implication, that an attachment may accompany the message. In FIG. 2A, an attachment, as indicated in 'attachment' field 212, is attached to the message 200A, and the message 200A refers to the attachment directly in one way, and by implication in another. The prepositional verb contraction "here's" directly refers to something not in the message body, itself. The referred to item, in the text appearing in FIG. 2A, is a "picture." Pictures may be attached to email messages, but are not "in" the message body, proper. Thus, referring to one in the context of message 200A implies that one may be attached.

Exemplary Prompting Based on Analyses of Addressees

Figure 2B:
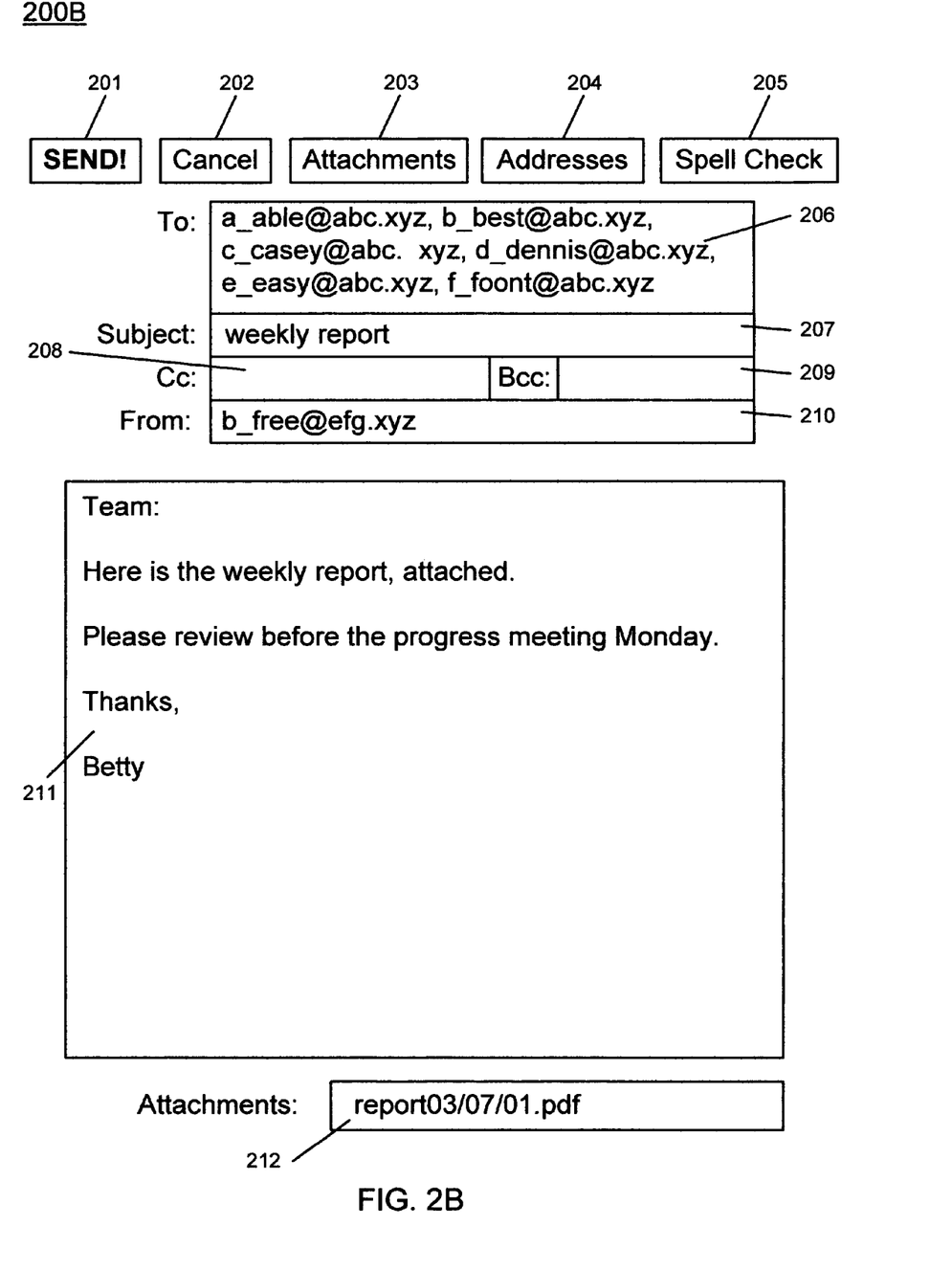
FIG. 2B is a screen shot from a computer display screen depicting a sample email message, bearing an attachment, with multiple addressees, in accordance with one embodiment of the present invention.

With reference to FIG. 2B, a screen shot from a computer display of a sample email message 200B is depicted, bearing an attachment, with multiple addressees, in accordance with one embodiment of the present invention.

Message 200B differs from message 200A (FIG. 2A) in several respects, although their overall structural formats are identical, as is the overall structural format of all subsequent email messages to be discussed subsequently herein.

Message 200B has a different sender listed in 'From' field 210 than did message 200A (FIG. 2A). Unlike message 200A (FIG. 2A), no copy of message 200B is addressed to any recipient in 'Cc' block 208. Also, since the text of text field 211 differs from message 200A (FIG. 2A), and a different attachment is referred to, the subject specified in 'subject' field 207 differs, as well. Perhaps the most notable, or obvious difference between messages 200B and 200A (FIG. 2A) is that FIG. 200B is addressed to six (6) separate addressees, whereas message 200A (FIG. 2A) was addressed to one (1).

Each of the addressees specified in 'to' field 206 will individually receive copies of message 200B upon its transmission, routing, and delivery. Frequently, certain types of messages addressed to certain addressees, here a group addressee, or group of certain individual addressees, in some email applications, may be particularly likely to bear attachments. For example, the subject of message 200B appearing in 'subject' field 207 is a "weekly report," subsequently referred to in text field 211. In the present example, message 200B may reflect a type of message that frequently, if not invariably, contains an attachment.

Message 200B refers to a weekly report; thus it may be a weekly email message, sent by the same sender to the same addressees. A weekly report, in many business contexts, may be a long textual document, a spreadsheet or some similar format, too lengthy and/or complex for inclusion in the typical message body text proper, e.g., typed into text field 211. Thus, the attachment feature is a convenient way to transmit the information via email. However, attachment requires intentional action on the part of a sender. If that action is not taken, the message may be transmitted without the attachment. This would be a worthless, wasted email transmission, causing extra work and embarrassment to the sender, and confusing and wasting the time and efforts of the addressees; here, six of them. Complications due to untimeliness may also be an unwelcome possibility.

Figure 2C:
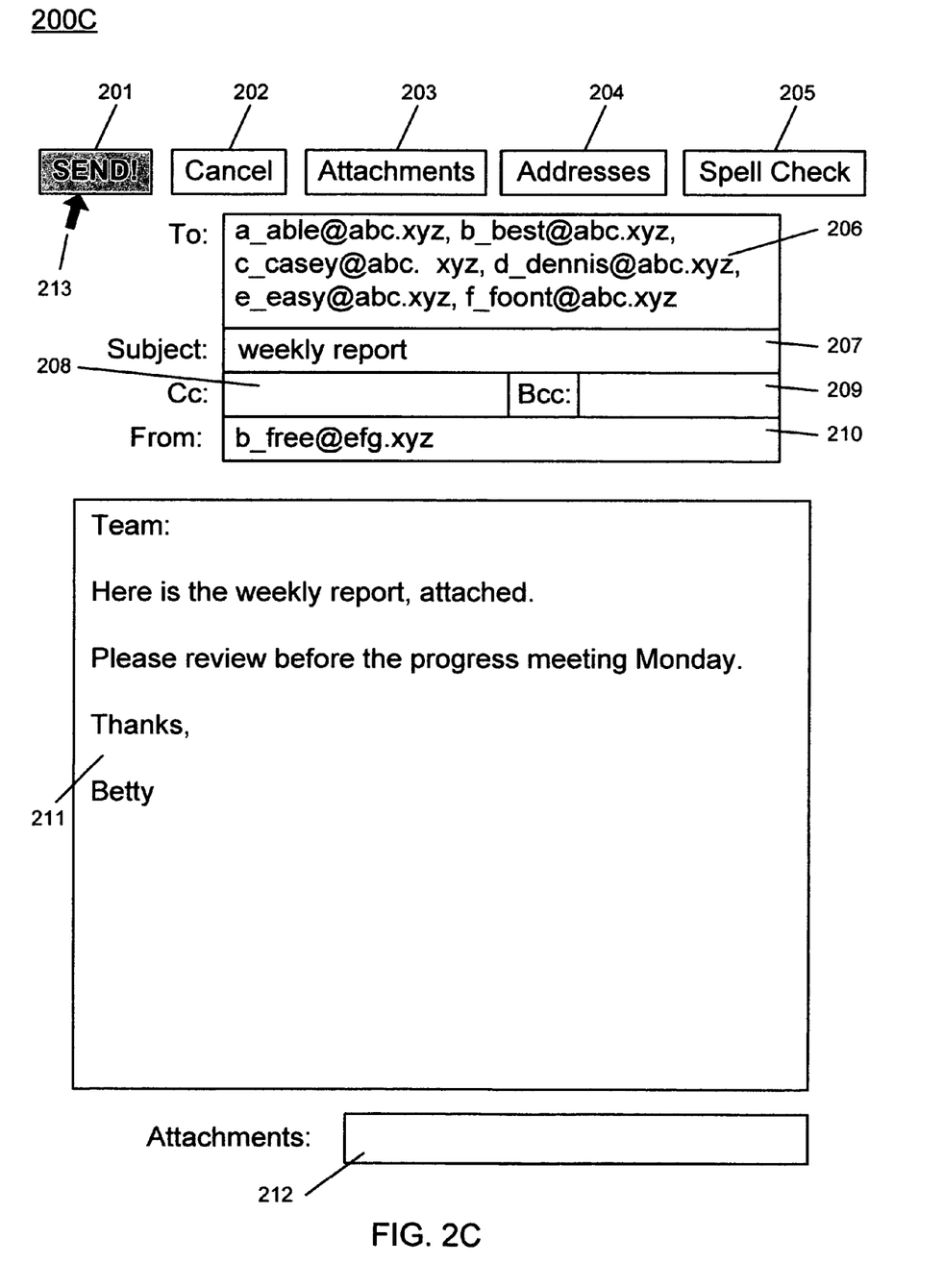
FIG. 2C is a screen shot from a computer display screen depicting a sample email message being sent, lacking an attachment, with multiple addressees, in accordance with one embodiment of the present invention.

This is illustrated in FIG. 2C, wherein the sender has failed to attach the required and referred to attachment, but transmits the message, 200C, bearing the identical message text proper in text field 211 as message 200B (FIG. 2B), but lacking the attachment, the kernel and important part of this particular message.

The sender has positioned a cursor 213 (e.g., an on-screen aspect of cursor control 1035, FIG. 1) and taken some action (e.g., clicking a mouse) to activate 'send' screen button 201, which has gone momentarily dark to indicate that the email system (e.g., system 1000, FIG. 1) is attempting to execute the function of sending the email message 200C.

In one embodiment of the present invention, an process may employ information from a database (e.g., database 402, FIG. 4), to compare the identity or identities of intended addressees to a database of addressees who normally receive email messages with attachments, generate a comparison of the intended addressees to the database "attachment-prone" addressees, and alert the sender that the email message 200C intended to be sent does not have said attachment, and if sent presently will lack an attachment.

In one embodiment, if no attachment has been attached to message 200C, e.g., 'attachment' field 212 is empty, the process reads the addresses of the addressees as they appear in the 'to' field 206 to identify the message addressee address as it appears in 'To' field 206. It then compares the addressee of message 200C to a databased list of certain specific addressees who, individually or together, frequently receive email messages with attachments. The process then identifies the addressees of message 200C as such certain, specific addressees normally receiving email messages with attachments as a certain addressee, corresponding to one or a group of addressees specified in the "attachment-prone" addressee database, e.g., determines that, for the present message 200C, one of the certain, specific addressees exist, and triggers an alert mechanism, accordingly.

Figure 2D:
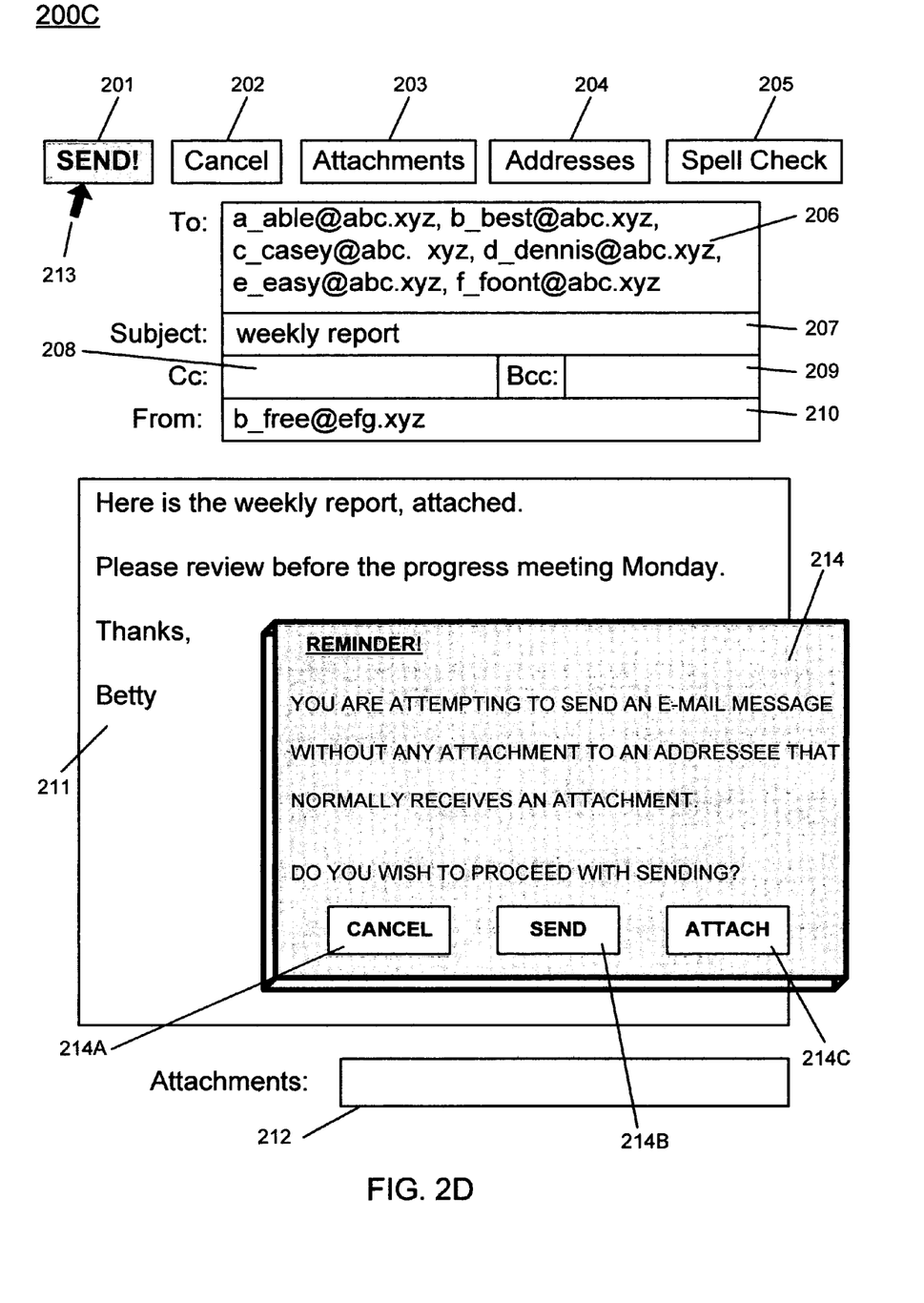
FIG. 2D is a screen shot from a computer display screen depicting a sample email message, lacking an attachment, with multiple addressees, and a pop-up window displaying an alert, in accordance with one embodiment of the present invention.

With reference to FIG. 2D, an on-screen alert 214 to the sender is depicted, in accordance with one embodiment of the present invention. On screen alert is triggered by the process in response to a sender attempting to transmit message 200C without attachment presence, to intended addressees, identified as frequently receiving messages with attachments. In the present embodiment, on-screen alert 214 is a pop-up screen window stating that, as a reminder, the sender is attempting to send an email message without an attachment, to an addressee normally receiving attachments with email messages from this sender.

On-screen alert 214 interrogates the user as to whether continued attachmentless transmission is desired. In the present embodiment, the sender is provided with three (3) options, typified by three (3) screen buttons. 'Cancel' screen button 214A enables the user to cancel transmission and return to the message. 'Send' screen button 214B enables the user to transmit the message, as-is, e.g., without attachment, effectively confirming that this particular message 200C, notwithstanding the identity of the intended addressee, is to be transmitted without attachment, and proceeding with the initiated transmission.

'Attach' screen button 214C enables a sender to attach an attachment. In one embodiment, activation of the 'attach' screen button 214C may generate further pop-up messages, enabling the user to browse through a file management or similar functional data structure to locate a particular file or files for attachment, identify and indicate a particular file for attachment, attach the file, and return to the message for transmission. In another embodiment, other file retrieval mechanisms may be used.

In another embodiment, other ways to cue the sender with an alert that a message is attempting to be sent without attachment to an addressee normally receiving attachments may be used. In one embodiment, the cues may be other modes of prompting with visible or audible sensory cues, or combinations of visible and audible sensory cues. In one embodiment, the sensory cue is another on-screen display, such as a drop-down flag or a flashing toolbar icon. In one embodiment, the prompt may be an audible cue, such as a tone or synthesized speech. In another embodiment, audible cues may accompany a pop-up window, or other visible cues.

Exemplary Prompting Based on Analyses of Textual Syntax

Figure 3A:
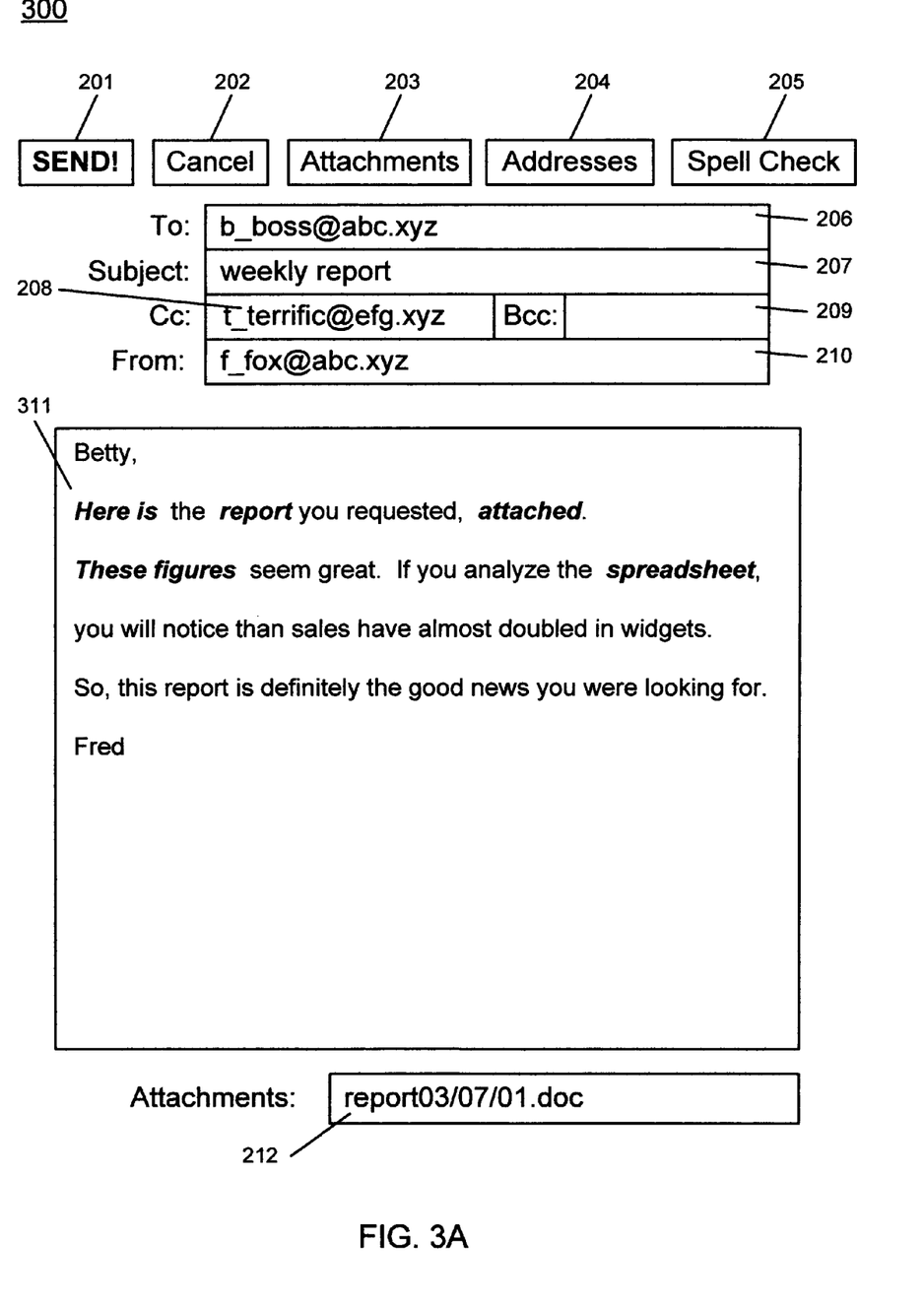
FIG. 3A is a screen shot from a computer display screen depicting a sample email message, bearing an attachment, with single 'To' and 'Cc' addressees, the textual content of which bearing keywords, in accordance with one embodiment of the present invention.

In another embodiment of the present invention, a process may utilize information other than intended addressees, or in conjunction with information about intended addressees, to alert a user that an email message is about to be transmitted without attachments, where attachment would be properly desirable. With reference to FIG. 3A, an email message 300 containing text 311 has an attachment, as reflected by the identification of an attachment in the attachment field 212.

Analysis of the syntactic content of the text 311 of email message 300 implies that such an attachment is intended. For example, the phrases "Here is," "attached," "These figures," "spreadsheet," and "this report," all highlighted for illustrative emphasis in FIG. 3A (and subsequent FIGS. 3B and 3C), may provide such an implication. Further, the implication may run deeper by application of an process in accordance with one embodiment of the present invention.

In the present embodiment, a process may employ information from a syntax database (e.g., database 403, FIG. 4), to determine whether a sender of email message 300, having a certain syntactic content as reflected in message text 311, intends to transmit email message 300 without an attachment, prior to transmission. The process of the present embodiment analyzes message text 311 by parsing its syntactic content, comparing its syntactic content to the syntax database and generating a syntactic comparison which may indicate the desirability of an attachment. Where an attachment is deemed probably desirable, the sender is alerted that the email message does not have said attachment, and that attachment of one may be desirable before transmission.

In the present embodiment, the syntax database (e.g., database 403, FIG. 4) is a list of specified terms, which may be considered to be keywords, phrases, and other terms. These keywords, phrases, and other specified terms correspond to a high frequency of appearance within email messages, which are of a message species characterized by a high frequency of transmission with attachments. Certain textual terms and other syntactic structures of text 311 are recognized, in the present embodiment, as syntactic terms identical or similar to terms contained within the syntax database corresponding to a high frequency of presence in email messages usually transmitted with attachments. The terms are thus identified as certain terms implying a high probability that an attachment to their message is desirable.

Figure 3B:
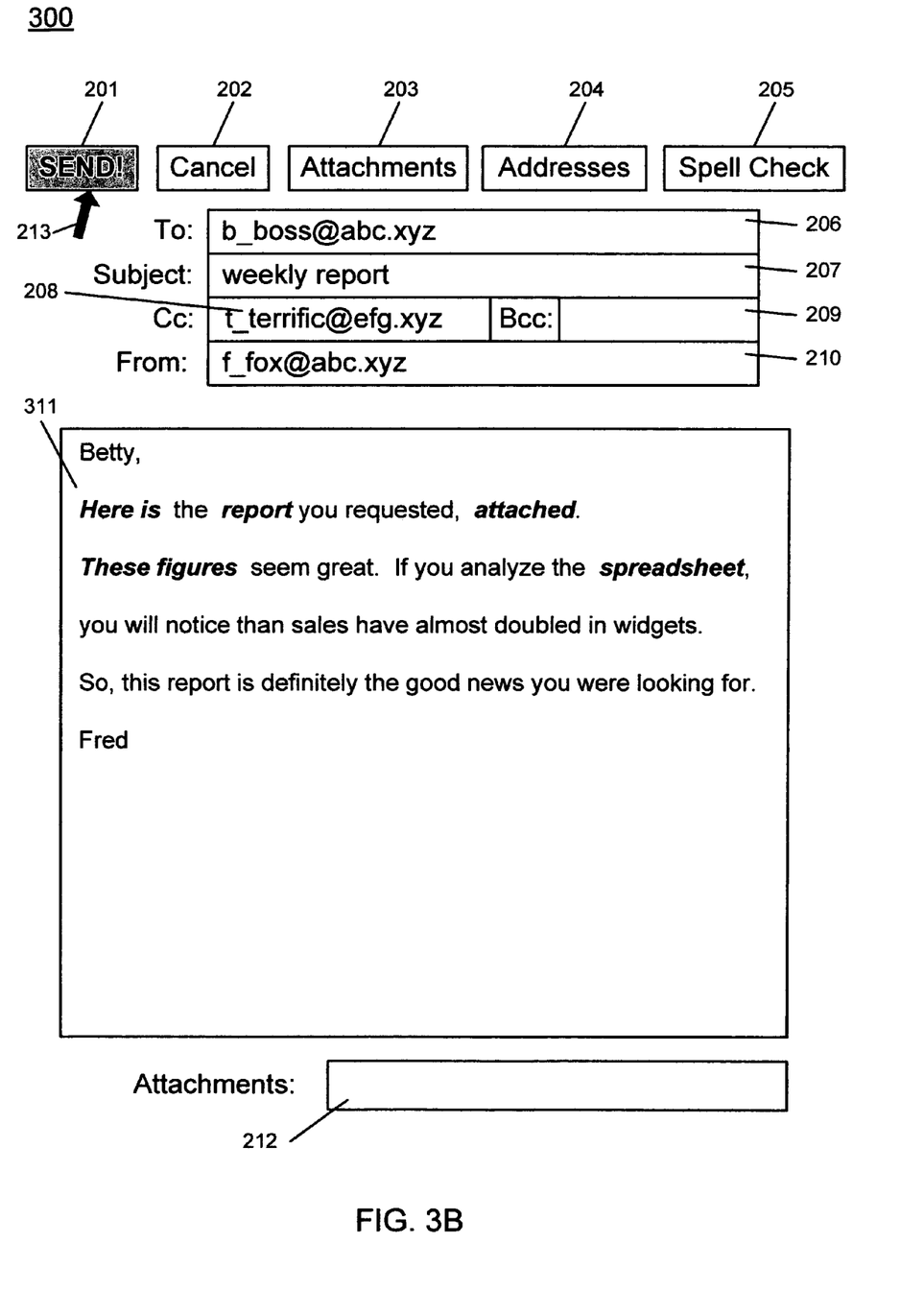
FIG. 3B is a screen shot from a computer display screen depicting a sample email message being sent, lacking an attachment, with single 'To' and 'Cc' addressees, the textual content of which bearing keywords, in accordance with one embodiment of the present invention.

With reference to FIG. 3B, message 300 is depicted as lacking an attachment, in as much as 'attachment' field 212 is empty. This, notwithstanding the presence of key syntactic terms associated with a high frequency of message transmission accompanied by attachments, and thus implying that an attachment to message 300 may be desirable. Nonetheless, the sender has used cursor 213 to activate 'send' screen button 201. In the present embodiment, this determination triggers alerting the sender to the probable desirability of an attachment to the message, prior to transmission.

Figure 3C:
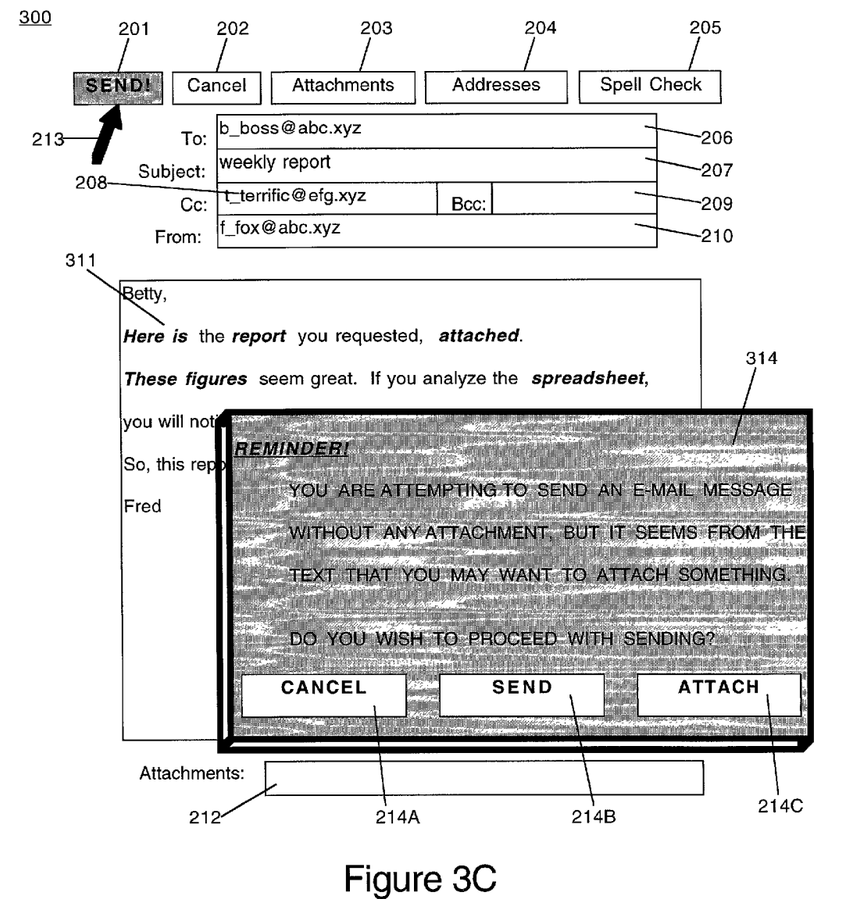
FIG. 3C is a screen shot from a computer display screen depicting a sample email message being sent, lacking an attachment, with single 'To' and 'Cc' addressees, the textual content of which bearing keywords, and a pop-up window displaying an alert, in accordance with one embodiment of the present invention.

So alerting the sender is depicted in FIG. 3C. In the present embodiment, a pop-up screen window 314 is generated to prompt the user that he/she is attempting to send message 300 with no attachment, although syntactic elements within text 311, e.g., keywords, phrases and other syntactic terms identified by comparison with syntax database (e.g., database 403, FIG. 4) indicate that an attachment may be desirable. Screen buttons 214A, 214B, and 214C accord the sender the opportunity to 'Cancel' and return to the message, 'Send' message 300, as is, e.g., without attachment, or to 'Attach' an attachment, respectively.

In the context of the present embodiment, the order in which email message content analysis proceeds is immaterial; e.g., whether with syntactic textual analysis precedes checking addressees, vice versa, or whether the analyses proceed simultaneously.

Exemplary Database Structure

Figure 4:
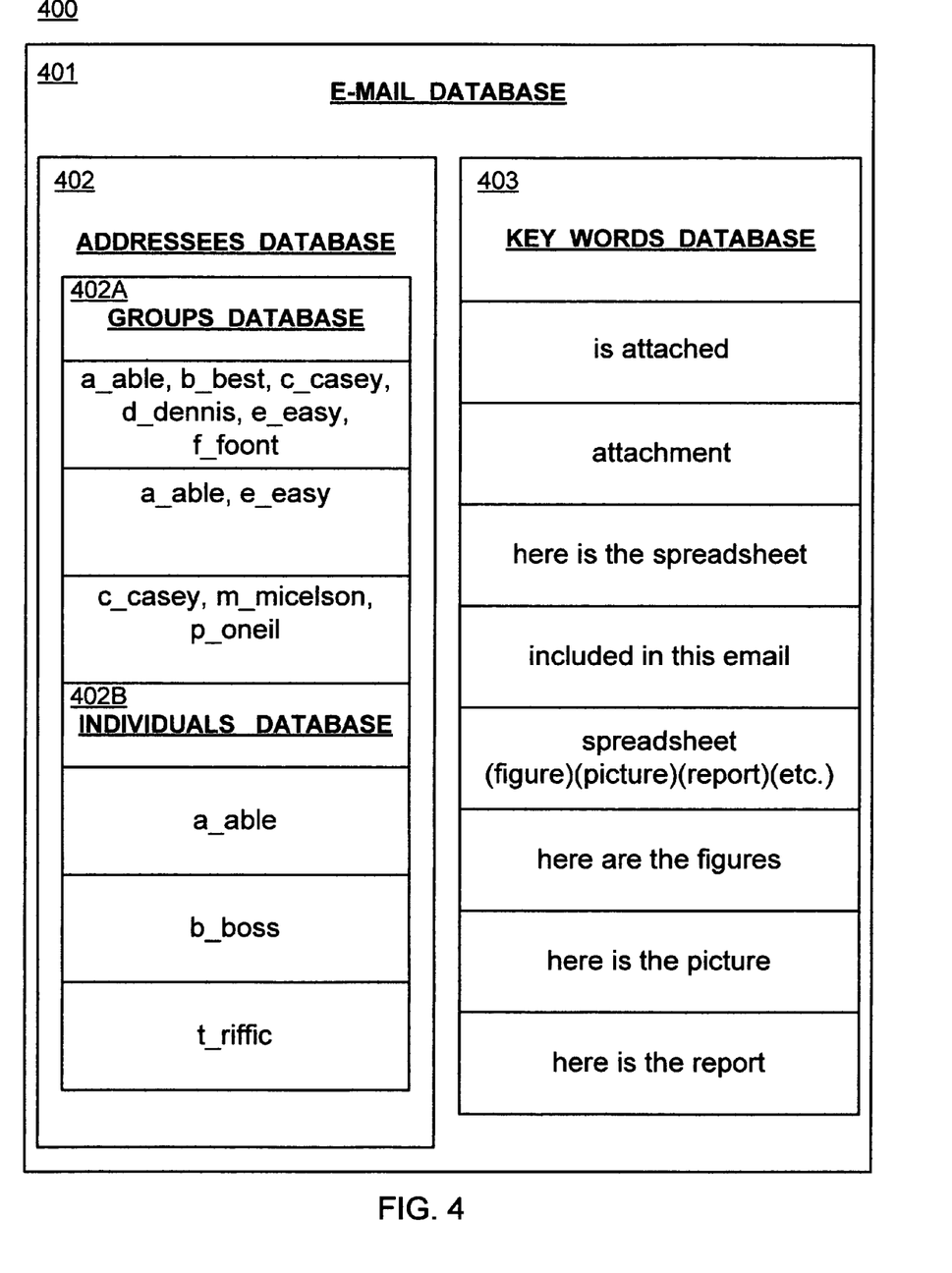
FIG. 4 is a structural view of several databases, in accordance with one embodiment of the present invention.

With reference to FIG. 4, a database structure 400 is characterized by an email database 401 containing a database 402 of addressees and a database 403 of syntax, in accordance with one embodiment of the present invention. In the present embodiment, database 401 may be established in the memory, data storage systems, and or central processor (e.g., 1010, 1015, and 1050, respectively, FIG. 1) of a computer system (e.g., system 1000, FIG. 1), and may be implemented through a computer readable medium (e.g., 1000m, FIG. 1) deployed thereon.

In the present embodiment, syntax database 403 contains syntactic terms frequently associated with, e.g., within the text of, certain email messages (e.g., message 300, FIGS. 3A–3C) frequently associated with email transmission with attachments. In the present embodiment, such syntactic terms may also be words or phrases that may imply the desirability of a message attachment, such as by reference to an attachment (e.g., "is attached," attachment," "included in this email is," "here is the spreadsheet/figures/picture/report/ etc."). Implication may also be made by naming a kind of attachment (e.g., spreadsheet, figure, report, picture, etc.). Such syntactic terms may overlap. The appearance of these key syntactic terms in the text of an email message (e.g., text 311, message 300; FIGS. 3A–3C), implies a probable desirability of message attachments.

In the present embodiment, addressee database 402 contains a group database 402A listing multiple addressees. When these individual addressees appear together as a group, e.g., in 'To' field 206, FIGS. 2B–2D), they imply a probable desirability of attachment to a message, notwithstanding that as individuals, or grouped differently, they may not imply the same thing. Addressee database 402 also contains an individual addressees database. These individual addressees, on their own, imply a probable desirability of message attachments.

Within addressee database 402, addressees may be listed by user identifiers, user names, user email addresses, Universal Resource Locators (URL), user aliases, or any other electronically codable tags.

These databases are consulted, in one embodiment, each time an email message is to be transmitted without an attachment. In the present embodiment, transmission of a message with an attachment does not activate any corresponding database consultation, advantageously conserving time and processing and RAM resources, and reducing user annoyance and inconvenience.

In one embodiment, database 403 may be initially preprogrammed with an assortment of keyword syntactic terms determined by prior study to indicate a probable desirability of message attachments. In one embodiment, both databases 402 and 403 may be primed, or subsequently supplemented or adjusted by a user, manually entering key syntactic terms and addressees indicating a probable desirability of message attachment. In one embodiment, databases 402 and 403 are updated automatically, via a self learning modality. In one embodiment, both automatic updating and manual user updating are available in conjunction.

Automatic updating of the databases 402 may occur heuristically, by detecting that the particular email message (e.g., messages 200A, 200B; FIGS. 2A and 2C, respectively) is transmitted with or without attachment. The attachment status of the message is treated as a corresponding bit of specific attachment transmission frequency information. The attachment-prone addressee database is adjusted accordingly, and the updating feature is self-learning.

Automatic updating of the databases 403 may occur heuristically, by detecting that the particular email message (e.g., messages 300A, 300B; FIGS. 3A and 3C, respectively) is transmitted with or without attachment. The attachment status of the message is treated as a corresponding bit of specific attachment transmission frequency information. The attachment-prone addressee database is adjusted accordingly, and the updating feature is self-learning.

Exemplary Process

Figure 5:
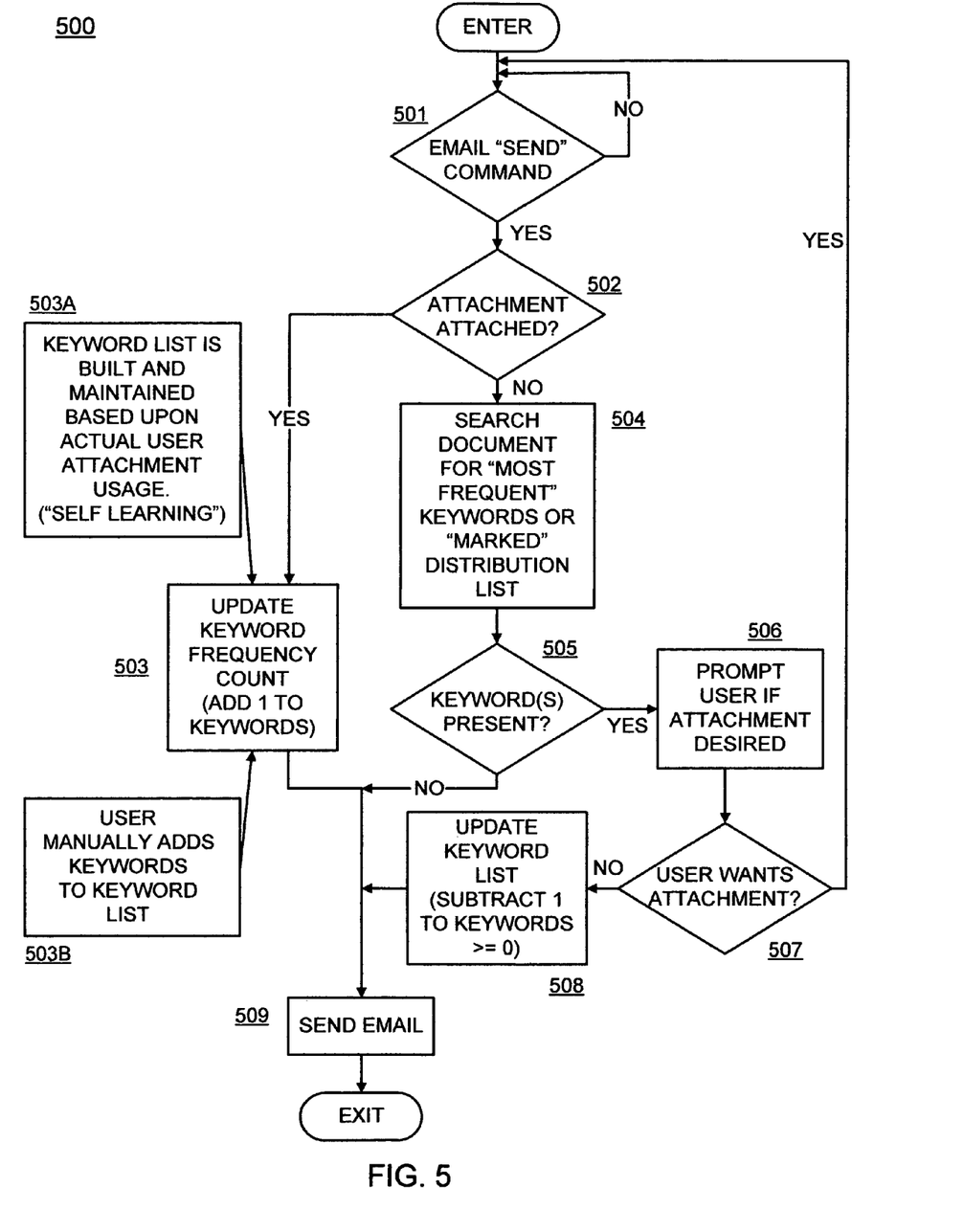
FIG. 5 is a flowchart depicting the steps in a process for verifying email transmission related to attachments, in accordance with one embodiment of the present invention.

With reference to FIG. 5, the steps in a computer-implemented process 500 indicate the operation of one embodiment of the present invention. Beginning at step 501, a system (e.g., computer system 1000; FIG. 1) implementing an email program receives a 'send' command (e.g., by activation of 'send' screen buttons 201, FIGS. 2A–3C). If no 'send' command is received, the program waits for one.

If a 'send' command is received, it is determined whether or not an attachment is attached to the message (e.g., messages 200, 300; FIGS. 2A–3C, respectively) being sent, step 502.

If an attachment is attached to the message, the syntax keyword frequency count is updated, step 503, wherein in one embodiment of the invention, the message text (e.g., text 311, FIGS. 3A–3C) is analyzed for the presence of key syntactic terms appearing in a syntax database (e.g., database 403; FIG. 4). A running tally of usage frequency, e.g., frequency of inclusion of the particular key syntactic term in an email sent with attachments, is correspondingly updated. In the present embodiment, database 403 is thus self-learning, e.g., the syntax list is built and maintained based on constant observation and tally of actual user attachment usage, step 503A. In one embodiment, a user may manually add desired syntactic terms to the database, step 503B.

Upon updating the syntax databases (step 503), the email message is transmitted; sent to the designated addressee, step 509, and process 500 is complete.

In the event that no attachment was detected in step 502, the document content, e.g., both text and addressee, is searched to determine the presence of and identify key syntactic structures or certain addressees, either indicative of probable desirability of attachment inclusion, step 504. The search is conducted in conjunction with reference to an email database structure (e.g., database structure 401; FIG. 4) constituted by a key syntactic terms database (e.g., database 403; FIG. 4) and a 'marked distribution list', e.g., an "attachment-prone addressee" database (e.g., database 402; FIG. 4).

A determination is made whether or not key syntactic terms or marked attachment-prone addressees do appear within the email message content, step 505.

If no key syntactic terms or marked attachment-prone addressees are identified in the email message content, then the email message is transmitted, as is, step 509, and process 500 is complete.

If either key syntactic terms or marked attachment-prone addressees do appear within the email message content, the sender is signaled by visual, audible, or combination audio-visual sensory cues that the desirability of an attachment to the message is probable, and thereby prompted if an attachment is desired, step 507.

If an attachment is desired at this point by the user, an opportunity is accorded to attach one prior to transmission (e.g., by 'attach' screen buttons 214C; FIGS. 2D and 3C). In one embodiment, a file browsing and attachment feature is engaged. In another embodiment, attachment may be enabled by another means. In either embodiment, at this point, process 500 restarts at step 501.

If the user decides in step 507 that no attachment is to be made, the syntax and addressee databases (e.g., databases 403 and 402, respectively; FIG. 4) is automatically updated as to attachment frequency correlation to key syntactic terms and attachment-prone addressees, step 508.

Upon completion of automatic database updating (step 508), the email transmitted, step 509, and process 500 is complete.

In summary, the present invention provides a method and a system thereof, which prompts an email user as to whether an attachment is to accompany an email message prior to transmission of the message. In one embodiment, the present invention provides a method, which can prompt an email user as to whether an attachment is to accompany an email addressed to certain individuals, groups, or organizations, prior to transmission of the message. In one embodiment, a database of certain addressees to whom attachments are frequently transmitted is consulted. In one embodiment, the present invention provides a method, which automatically prompts users based on the content of an email message as to whether an attachment is desired prior to transmission. In one embodiment, a database of certain keywords appearing in message text frequently correlated with attachment inclusion is consulted. In one embodiment, the databases are automatically updated by a self-learning modality. In one embodiment, the method is implemented on a computer system. In one embodiment, the computer system implements the method under control of a computer readable medium implanted thereon.

In accordance with one embodiment of the present invention, a method, system thereof, and computer readable medium for confirming that a sender of an electronic mail message, having a syntactic content and an addressed destination, intends to transmit said electronic mail message without an attachment, prior to transmitting said electronic mail message are enabled. In one embodiment, parsing the syntactic content of an email message and comparing its syntactic content to a syntax database generates a textual syntax comparison. In one embodiment, reading the addressed destination of an email message to determine an identity of an intended addressee and comparing the identity of the intended addressee to an addressee database generates an addressee comparison. In one embodiment, when either comparison yields a correlation to a probable desirability of attachment, the sender is alerted that the email message does not have an attachment. In one embodiment, the order of comparison is immaterial, e.g., whether textual syntax comparison precedes addressee comparison, vice versa, or whether the comparisons are run simultaneously. In one embodiment, the syntax database contains a list of specified terms, which correspond to a high frequency of appearance within email messages characterized by a high frequency of transmission with attachments.

In one embodiment, text syntax analysis proceeds by recognizing elements of text a group of syntactic terms, identifying certain of the terms, which correspond to specified terms in the syntax database, and triggering a user attachment prompt accordingly. In one embodiment, the addressee database contains a list of specified addressees who, as a group, are recurrent recipients of email messages characterized by a high frequency of transmission with attachments. In one embodiment, analysis of addressees involves recognizing an address of intended addressees, who may be addressed by user identifiers, user names, user email addresses, URLs, user aliases, or any other electronically codable tags.

In one embodiment, intended email message addressees are recognized, identifying them as a certain addressee corresponding to specified addressees listed in the addressee database corresponding to a probable desirability of email message attachment, and triggering a user prompt of probable attachment desirability, accordingly. In one embodiment, both the syntax database and the addressee database may be updated. In one embodiment, database updating is automatic by detecting that the email message is transmitted, with or without an attachment, considering said transmission a bit of specific corresponding frequency information, and adjusting the databases accordingly. In one embodiment, sender prompting is via sensory cues, which may be visible, audible, or combination audiovisual. In one embodiment, the prompt may be an on-screen display (e.g., pop-up window, drop-down flag, etc.), a tone, synthesized speech, or any combination.

An embodiment of the present invention, a method and a system thereof, which prompts an email user as to whether an attachment is to accompany an email message prior to transmission of the message is thus described. While the present invention has been described in particular embodiments, it should be appreciated that the present invention should not be construed as limited by such embodiments, but rather construed according to the below claims.

What is claimed is:

1. A method of sending an electronic message comprising:
   a) examining syntactic content of said electronic message;
   b) comparing said syntactic content to a keyword database for a syntactic match between said syntactic content and one or more keywords stored in said keyword database;
   c) examining an addressed destination of said message to determine an identity of an intended addressee;
   d) comparing said identity of said intended addressee to an addressee database for an address-based match between said identity and one or more addressees stored in said addressee database;
   e) provided that said message does not have an attachment, alerting a sender of said message that said electronic message does not have an attachment, based on one or more of said syntactic match and said address-based match; and
   f) automatically updating one or more of said first keyword database, based on said syntactic match, and said addressee database, based on said address-based match wherein, provided that said attachment is attached to said messages a frequency of one or more of a keyword correlation and an address-based correlations to each respective database is increased by one and wherein, provided that said attachment is not attached to said message, a frequency of one or more of said keyword correlation and said address-based correlations is decreased by one.

2. The method as recited in claim 1 wherein said a) through b) versus said c) through d) may be performed, selectively, in any order, and simultaneously.

3. The method as recited in claim 1 wherein said keyword database comprises a list of specified terms indicating that an attachment is likely to be desirable.

4. The method as recited in claim 3 wherein said specified terms correspond to a high frequency of appearance within electronic messages that have a high frequency of transmission with attachments.

5. The method as recited in claim 4 wherein said b) further comprises recognizing elements of said syntactic content wherein said elements comprise a plurality of syntactic terms.

6. The method as recited in claim 5 wherein said b) comprises:
   c1) identifying certain terms of said plurality of syntactic terms that correspond to said specified terms;
   c2) determining that any of said certain terms exist; and
   c3) triggering said e) according to said c2).

7. The method as recited in claim 1 wherein said addressee database comprises a list of specified addressees.

8. The method as recited in claim 7 wherein said specified addressees comprise a group of recipients of electronic mail messages and wherein said electronic messages are characterized by a high frequency of transmission with attachments.

9. The method as recited in claim 8, wherein said c) further comprises recognizing an address of said addressee, wherein said address is an user identifier, a user name, a user email address, a user Universal Resource Locator, or a user alias.

10. The method as recited in claim 9, wherein said d) further comprises:
    d1) identifying said address as a certain addressee, wherein said certain addressee corresponds to one of said specified addressees;
    d2) determining that any of said certain addressees exist; and
    d3) triggering said e) according to said d2).

11. The method as recited in claim 1 wherein said e) comprises activation of one or more of an on-screen display, a tone, synthesized speech, a pop-up window, and a drop-down flag.

12. The method as recited in claim 1, further comprising:
    g) upon said f, adjusting one or more of said correlations in the corresponding said address-based and keyword databases.

13. The method as recited in claim 12, further comprising:
    h) upon sending a subsequent electronic message, performing one or more of said b) and said d) on the basis of said g).

14. A method of sending an electronic message comprising:
    a) examining:
    content of said electronic message for one or more selected keywords therein, said selected keywords being of a keyword database of keywords associated with messages that frequently have attachments sent therewith; and an addressed destination of said message for an identity of an intended addressee that matches an addressee identity listed in an addressee database of addressee identities associated with messages that frequently have attachments sent therewith;

b) provided said electronic message does not already have an attachment associated therewith, alerting a user that said electronic message does not have an attachment associated therewith provided:

one or more of said selected keyword is located within said electronic message; and said addressed destination matches an addressee identity listed in said addressee database;

c) upon said b), provided that said user sends said electronic message without an attachment, updating said keyword database wherein a correlation of sending electronic messages having said one or more keywords with attachments is decreased by one;

d) upon said b), provided that said user attaches an attachment, correspondingly updating:

said keyword database wherein a correlation of sending electronic messages having said one or more keywords with attachments is increased by one; and said addressee database wherein a correlation of sending electronic messages having said addressee identity with attachments is increased by one;

e) provided that said electronic message does have an attachment associated therewith, correspondingly updating:

said keyword database wherein a correlation of sending electronic messages having said one or more keywords with attachments is increased by one; and said addressee database wherein a correlation of sending electronic messages having said addressee identity with attachments is increased by one.

15. A method as recited in claim 14, wherein said electronic message comprises an electronic mail message.

16. A method as recited in claim 14 wherein said b) comprises displaying a message on a computer display screen that said electronic message does not have an attachment associated therewith.

17. The method as recited in claim 14, further comprising:

k) upon one or more of said c), d), e), h), l) and j), adjusting one or more of said correlations in the corresponding said address-based and keyword databases.

18. The method as recited in claim 17, further comprising:

l) upon sending a subsequent electronic message, performing one or more of said a) and said f) on the basis of said k).

19. A method of sending an electronic message comprising:

a) examining an addressed recipient of said an electronic message against selected identifications, said selected identifications being of an address-based database of identifications that comprise recipients of messages that frequently have attachments sent therewith;

b) provided that said electronic message does not already have an attachment associated therewith, alerting a user that said electronic message does not have an attachment associated therewith provided one of said selected identifications is said recipient of said electronic message;

c) upon said b), provided that said user sends said electronic message without an attachment updating said address-based database that a correlation of sending electronic messages to said addressed recipient with attachments is decreased by one;

d) upon said b), provided that said user attaches said attachment, updating said address-based database that said correlation of sending electronic messages to said addressed recipient is increased by one; and e) provided that said electronic message does have an attachment associated therewith, updating said address-based database that said correlation of sending electronic messages to said addressed recipient is increased by one.

20. A method as recited in claim 19 wherein said electronic message comprises an electronic mail message.

21. A method as recited in claim 19 wherein said b) comprises displaying a message on a computer display screen that said electronic message does not have an attachment associated therewith.

22. The method as recited in claim 19, further comprising:

f) examining content of said an electronic message for one or more selected keywords therein, said selected keywords being of a keyword database of keywords associated with messages that frequently have attachments sent therewith;

g) alerting a user if said electronic message does not have an attachment associated therewith provided one of said selected keyword is located within said electronic message;

h) upon said g), provided that said user sends said electronic message without an attachment, updating said keyword database that a correlation of sending electronic messages having said one or more keywords with attachments is decreased by one;

i) provided that said user attaches an attachment updating said keyword database that a correlation of sending electronic messages having said one or more keywords with attachments is increased by one; and j) provided that said electronic message does have an attachment associated therewith, updating said keyword database that a correlation of sending electronic messages having said one or more keywords with attachments has increased by one.

23. The method as recited in claim 22, further comprising:

k) upon one or more of said c), d), e), h), l) and j), adjusting one or more of said correlations in the corresponding said address-based and keyword databases.

24. The method as recited in claim 23, further comprising:

l) upon sending a subsequent electronic message, performing one or more of said a) and said f) on the basis of said k).

* * * * *